US011186456B2

(12) United States Patent
Ishii et al.

(10) Patent No.: US 11,186,456 B2
(45) Date of Patent: Nov. 30, 2021

(54) CONVEYING DEVICE, IMAGE FORMING APPARATUS INCORPORATING THE CONVEYING DEVICE, POSITION DETECTING METHOD OF THE IMAGE FORMING APPARATUS, AND RECORDING MEDIUM

(71) Applicants: Tatsuya Ishii, Kanagawa (JP); Takehiro Chiba, Kanagawa (JP); Yuji Karikusa, Kanagawa (JP)

(72) Inventors: Tatsuya Ishii, Kanagawa (JP); Takehiro Chiba, Kanagawa (JP); Yuji Karikusa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 416 days.

(21) Appl. No.: 16/356,667

(22) Filed: Mar. 18, 2019

(65) Prior Publication Data
US 2019/0300310 A1  Oct. 3, 2019

(30) Foreign Application Priority Data

Mar. 30, 2018 (JP) .............................. JP2018-068323
Nov. 30, 2018 (JP) .............................. JP2018-225958

(51) Int. Cl.
*G06K 15/00* (2006.01)
*B65H 7/06* (2006.01)
(Continued)

(52) U.S. Cl.
CPC ............ *B65H 7/06* (2013.01); *B41J 11/0095* (2013.01); *B65H 5/02* (2013.01); *B65H 5/06* (2013.01);
(Continued)

(58) Field of Classification Search
None
See application file for complete search history.

(56) References Cited

U.S. PATENT DOCUMENTS

| 5,419,547 A | 5/1995 | Jeong | |
| 6,385,406 B1 * | 5/2002 | Funamizu | ............... B65H 7/00 |
| | | | 271/265.02 |

(Continued)

FOREIGN PATENT DOCUMENTS

| JP | 10-093787 | 4/1998 |
| JP | 2005-223381 | 8/2005 |
| JP | 2014-174351 | 9/2014 |

OTHER PUBLICATIONS

European Search Report; Application EP19161377; dated Aug. 28, 2019.

*Primary Examiner* — Dung D Tran
(74) *Attorney, Agent, or Firm* — Duft & Bornsen, PC

(57) ABSTRACT

A conveying device includes a sensor to read a sheet to be conveyed, a first conveyor arranged on an upstream side from the sensor in a sheet conveying direction of the sheet, a second conveyor arranged on a downstream side from the sensor in the sheet conveying direction, and correcting circuitry to correct a distance of the sheet having an error detected when the sensor reads the sheet conveyed by the first conveyor and the second conveyor, to an actual distance. The correcting circuitry uses at least a first correction value correcting a distance read by the sensor when the first conveyor conveys the sheet and a second correction value correcting a distance read by the sensor when the second conveyor conveys the sheet.

9 Claims, 8 Drawing Sheets

(51) Int. Cl.
*B65H 5/06* (2006.01)
*H04N 1/00* (2006.01)
*B65H 5/02* (2006.01)
*B41J 11/00* (2006.01)

(52) U.S. Cl.
CPC ..... *H04N 1/00716* (2013.01); *H04N 1/00724* (2013.01); *H04N 1/00745* (2013.01); *H04N 1/00779* (2013.01); *H04N 1/00785* (2013.01); *B41J 2203/01* (2020.08); *B65H 2511/13* (2013.01); *B65H 2511/22* (2013.01); *B65H 2511/24* (2013.01); *B65H 2511/512* (2013.01); *B65H 2513/53* (2013.01); *B65H 2553/82* (2013.01); *B65H 2701/1311* (2013.01); *B65H 2701/1313* (2013.01)

(56) References Cited

U.S. PATENT DOCUMENTS

| | | | |
|---|---|---|---|
| 9,030,715 B2* | 5/2015 | Sunada | H04N 1/00588 358/449 |
| 2008/0145123 A1* | 6/2008 | Kogure | B41J 13/0027 399/395 |
| 2012/0062929 A1 | 3/2012 | Ishii et al. | |
| 2013/0077137 A1 | 3/2013 | Nishikawa | |
| 2015/0212476 A1 | 7/2015 | Ishii | |
| 2017/0344819 A1* | 11/2017 | Murahashi | H04N 1/387 |
| 2018/0084145 A1* | 3/2018 | Isokawa | G03G 15/043 |

\* cited by examiner

<WHEN LEADING END OF SHEET IS BEING READ>

<WHEN TRAILING END OF SHEET IS BEING READ>

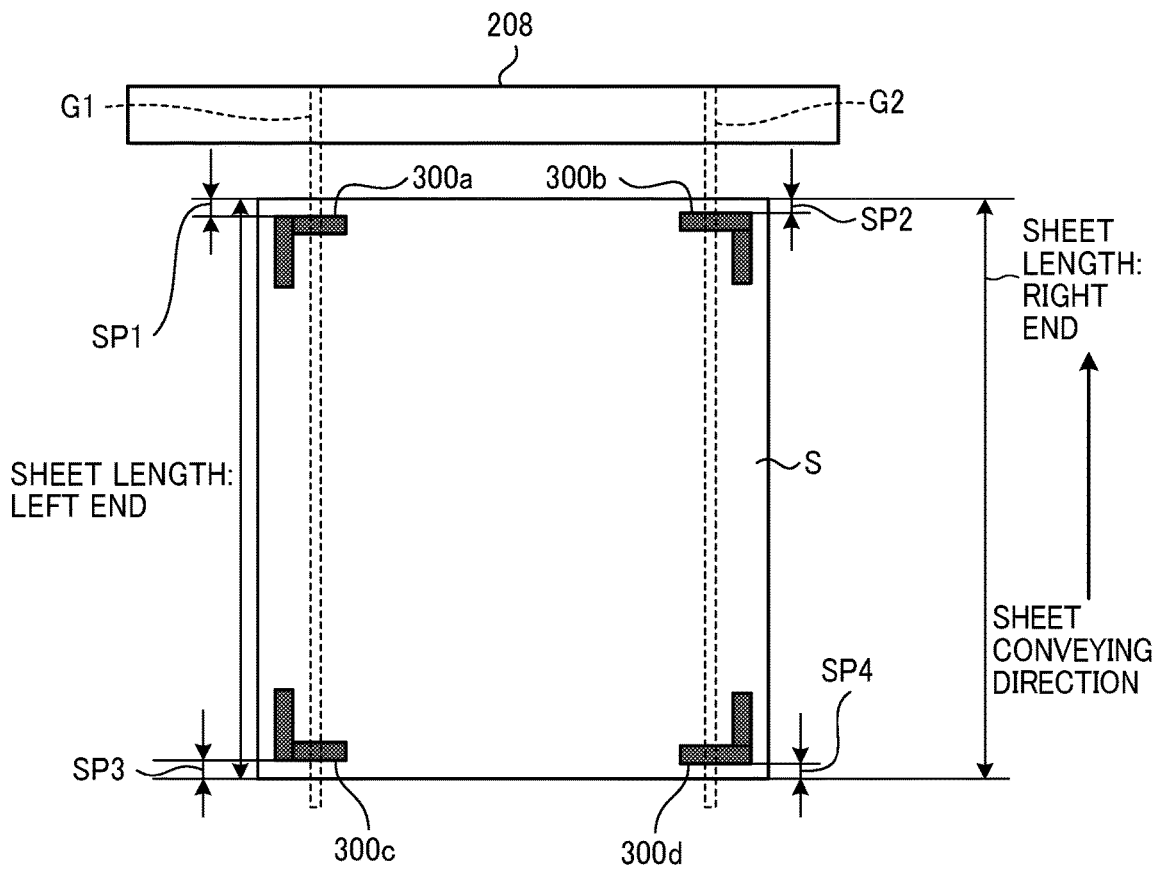

FIG. 8

| SHEET THICKNESS | LEADING END/ TRAILING END | BEFORE CORRECTION | AFTER CORRECTION |
|---|---|---|---|
| SHEET THICKNESS 1 | LEADING END | SHEET END-CORRECTION PATTERN DISTANCE 1 | (SHEET END – CORRECTION PATTERN DISTANCE 1) $*\alpha 1$ (LEADING END MAGNIFICATION) |
| | | SHEET END-CORRECTION PATTERN DISTANCE 2 | (SHEET END – CORRECTION PATTERN DISTANCE 2) $*\alpha 1$ (LEADING END MAGNIFICATION) |
| | TRAILING END | SHEET END-CORRECTION PATTERN DISTANCE 3 | (SHEET END – CORRECTION PATTERN DISTANCE 1) $*\beta 1$ (TRAILING END MAGNIFICATION) |
| | | SHEET END-CORRECTION PATTERN DISTANCE 4 | (SHEET END – CORRECTION PATTERN DISTANCE 2) $*\beta 1$ (TRAILING END MAGNIFICATION) |
| SHEET THICKNESS 2 | LEADING END | SHEET END-CORRECTION PATTERN DISTANCE 1 | (SHEET END – CORRECTION PATTERN DISTANCE 1 $*\alpha 2$ (LEADING END MAGNIFICATION) |
| | | SHEET END-CORRECTION PATTERN DISTANCE 2 | (SHEET END – CORRECTION PATTERN DISTANCE 2) $*\alpha 2$ (LEADING END MAGNIFICATION) |
| | TRAILING END | SHEET END-CORRECTION PATTERN DISTANCE 3 | (SHEET END – CORRECTION PATTERN DISTANCE 1) $*\beta 2$ (TRAILING END MAGNIFICATION) |
| | | SHEET END-CORRECTION PATTERN DISTANCE 4 | (SHEET END – CORRECTION PATTERN DISTANCE 2) $*\beta 2$ (TRAILING END MAGNIFICATION) |
| SHEET THICKNESS 3 | LEADING END | SHEET END-CORRECTION PATTERN DISTANCE 1 | (SHEET END – CORRECTION PATTERN DISTANCE 1) $*\alpha 3$ (LEADING END MAGNIFICATION) |
| | | SHEET END-CORRECTION PATTERN DISTANCE 2 | (SHEET END – CORRECTION PATTERN DISTANCE 2) $*\alpha 3$ (LEADING END MAGNIFICATION) |
| | TRAILING END | SHEET END-CORRECTION PATTERN DISTANCE 3 | (SHEET END – CORRECTION PATTERN DISTANCE 1) $*\beta 3$ (TRAILING END MAGNIFICATION) |
| | | SHEET END-CORRECTION PATTERN DISTANCE 4 | (SHEET END – CORRECTION PATTERN DISTANCE 2) $*\beta 3$ (TRAILING END MAGNIFICATION) |

FIG. 9

| SHEET THICKNESS | LEADING END/ TRAILING END | PRE-CORRECTION | AFTER CORRECTION |
|---|---|---|---|
| SHEET THICKNESS 1 | LEADING END | SHEET END-CORRECTION PATTERN DISTANCE 1 | (SHEET END-CORRECTION PATTERN DISTANCE 1) * $\alpha 1$ (LEADING END MAGNIFICATION) |
| | | SHEET END-CORRECTION PATTERN DISTANCE 2 | (SHEET END-CORRECTION PATTERN DISTANCE 2) * $\alpha 1$ (LEADING END MAGNIFICATION) |
| | TRAILING END | SHEET END-CORRECTION PATTERN DISTANCE 3 | (SHEET END-CORRECTION PATTERN DISTANCE 1) * $\beta 1$ (TRAILING END MAGNIFICATION) |
| | | SHEET END-CORRECTION PATTERN DISTANCE 4 | (SHEET END-CORRECTION PATTERN DISTANCE 2) * $\beta 1$ (TRAILING END MAGNIFICATION) |
| SHEET THICKNESS 2 | LEADING END | SHEET END-CORRECTION PATTERN DISTANCE 1 | (SHEET END-CORRECTION PATTERN DISTANCE 1 *1.1 * $\alpha 1$ (LEADING END MAGNIFICATION) |
| | | SHEET END-CORRECTION PATTERN DISTANCE 2 | (SHEET END-CORRECTION PATTERN DISTANCE 2) *1.1 * $\alpha 1$ (LEADING END MAGNIFICATION) |
| | TRAILING END | SHEET END-CORRECTION PATTERN DISTANCE 3 | (SHEET END-CORRECTION PATTERN DISTANCE 1) * 1.1 * $\beta 1$ (TRAILING END MAGNIFICATION) |
| | | SHEET END-CORRECTION PATTERN DISTANCE 4 | (SHEET END-CORRECTION PATTERN DISTANCE 2) * 1.1 * $\beta 1$ (TRAILING END MAGNIFICATION) |
| SHEET THICKNESS 3 | LEADING END | SHEET END-CORRECTION PATTERN DISTANCE 1 | (SHEET END-CORRECTION PATTERN DISTANCE 1) * 0.9 * $\alpha 1$ (LEADING END MAGNIFICATION) |
| | | SHEET END-CORRECTION PATTERN DISTANCE 2 | (SHEET END-CORRECTION PATTERN DISTANCE 2) * 0.9 * $\alpha 1$ (LEADING END MAGNIFICATION) |
| | TRAILING END | SHEET END-CORRECTION PATTERN DISTANCE 3 | (SHEET END-CORRECTION PATTERN DISTANCE 1) * 0.9 * $\beta 1$ (TRAILING END MAGNIFICATION) |
| | | SHEET END-CORRECTION PATTERN DISTANCE 4 | (SHEET END-CORRECTION PATTERN DISTANCE 2) * 0.9 * $\beta 1$ (TRAILING END MAGNIFICATION) |

CONVEYING DEVICE, IMAGE FORMING APPARATUS INCORPORATING THE CONVEYING DEVICE, POSITION DETECTING METHOD OF THE IMAGE FORMING APPARATUS, AND RECORDING MEDIUM

CROSS-REFERENCE TO RELATED APPLICATIONS

This patent application is based on and claims priority pursuant to 35 U.S.C. § 119(a) to Japanese Patent Application Nos. 2018-068323, filed on Mar. 30, 2018, and 2018-225958, filed on Nov. 30, 2018, in the Japan Patent Office, the entire disclosure of each of which is hereby incorporated by reference herein.

BACKGROUND

Technical Field

This disclosure relates to a conveying device, an image forming apparatus incorporating the conveying device, a position detecting method of the image forming apparatus, and a recording medium.

Discussion of the Background Art

For example, a known image forming apparatus has a configuration in which a detected position of an image on a recording medium is corrected on the basis of information relating to a difference between a distance between detection marks read by an inline sensor and a target distance.

SUMMARY

At least one aspect of this disclosure provides a conveying device including a sensor, a first conveyor, a second conveyor, and correcting circuitry. The sensor is configured to read a sheet to be conveyed. The first conveyor is arranged on an upstream side from the sensor in a sheet conveying direction of the sheet. The second conveyor is arranged on a downstream side from the sensor in the sheet conveying direction of the sheet. The correcting circuitry is configured to correct a distance of the sheet having an error detected when the sensor reads the sheet conveyed by the first conveyor and the second conveyor, to an actual distance. The correcting circuitry is configured to use at least a first correction value correcting a distance read by the sensor when the first conveyor conveys the sheet and a second correction value correcting a distance read by the sensor when the second conveyor conveys the sheet.

Further, at least one aspect of this disclosure provides an image forming apparatus including the above-described conveying device, and an image forming device configured to form an image on a sheet.

Further, at least one aspect of this disclosure provides a position detection method including reading, with a sensor, a sheet to be conveyed by a first conveyor and a second conveyor that are arranged on an upstream side and a downstream side, respectively, from the sensor in a sheet conveying direction of the sheet, and correcting a distance of the sheet having an error detected by the reading, to an actual distance. The correcting uses at least a first correction value correcting a distance read by the sensor when the first conveyor conveys the sheet and a second correction value correcting a distance read by the sensor when the second conveyor conveys the sheet.

Further, at least one aspect of this disclosure provides a non-transitory recording medium storing computer-readable program code which, when executed by a computer, cause the computer to perform a method. The method includes reading, with a sensor, a sheet to be conveyed by a first conveyor and a second conveyor that are arranged on an upstream side and a downstream side, respectively, from the sensor in a sheet conveying direction of the sheet, and correcting a distance of the sheet having an error detected when the sensor reads the sheet conveyed by the first conveyor and the second conveyor, to an actual distance. The correcting uses at least a first correction value correcting a distance read by the sensor when the first conveyor conveys the sheet and a second correction value correcting a distance read by the sensor when the second conveyor conveys the sheet.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 6 is an explanatory diagram illustrating an example of the detection of an end of a sheet in a sub-scanning direction and distance correction using a detection pattern;

FIG. 7 is a table illustrating an example of a correction coefficient for correcting a detected distance at a leading end or a trailing end of a sheet;

FIG. 8 is a table illustrating an example of a correction value in a case where the correction value is switched for each type of a sheet;

FIG. 9 is a table illustrating an example of a correction value obtained by adding a coefficient at the time of position detection correction at a leading end or a trailing end of a sheet to the correction value of FIG. 8.

Figure 1:
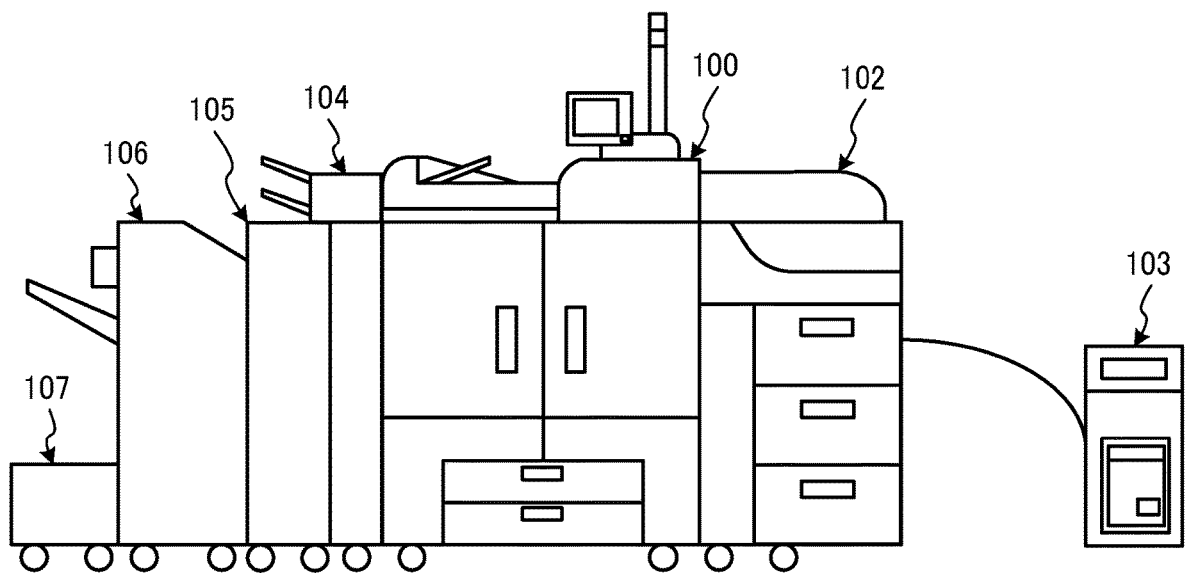
FIG. 1 is a schematic diagram illustrating a configuration of an image forming system that includes a conveying device according to an embodiment.

The aforementioned and other aspects, features, and advantages of the present disclosure would be better understood by reference to the following detailed description when considered in connection with the accompanying drawings, wherein:

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of this disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

Referring now to the drawings, embodiments of the present disclosure are described below. In the drawings for explaining the following embodiments, the same reference codes are allocated to elements (members or components) having the same function or shape and redundant descriptions thereof are omitted below.

An embodiment of a conveying device, an image forming apparatus, a position detection method, and a program according to the present disclosure is described below in detail referring to the attached drawings.

A conveying device according to the present embodiment causes a line sensor to detect a position in a sub-scanning direction at the time of conveyance of a sheet (in the present embodiment, referred to as a sheet S or paper). In response to a position detection result, the conveying device has a correction coefficient of conveyance speed for each detected position, and corrects the position (a distance) in the sub-scanning direction on the basis of the correction coefficient. A description is given below using a specific example.

Figure 2:
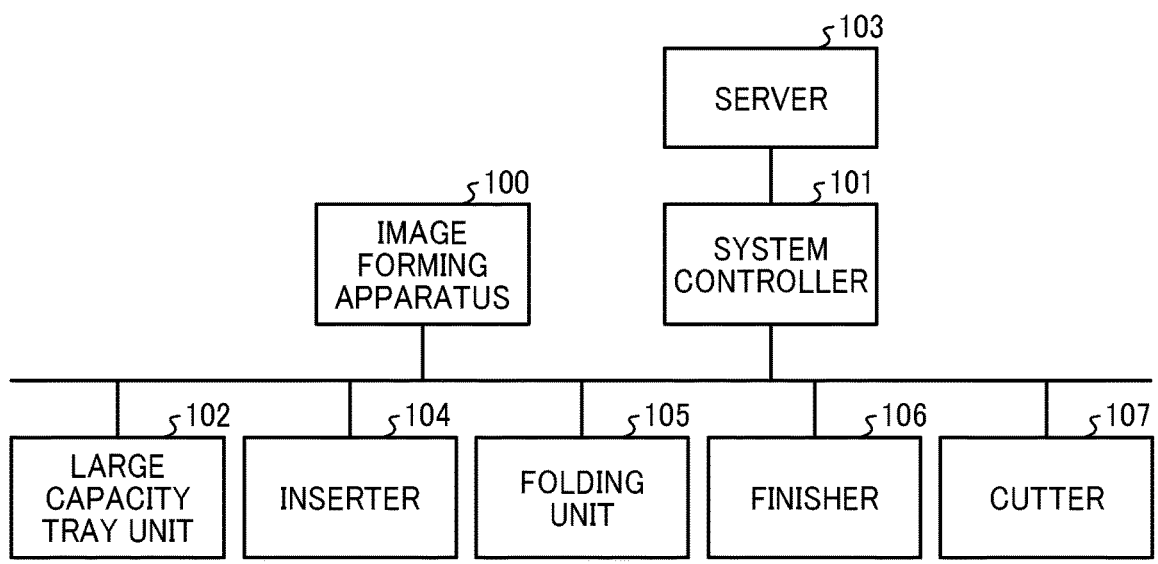
FIG. 2 is a block diagram illustrating a principal configuration of the image forming system of FIG. 1.

FIG. 1 is a schematic diagram illustrating a configuration of an image forming system that includes a conveying device according to an embodiment. FIG. 2 is a block diagram illustrating a principal configuration of the image forming system. This system includes an image forming apparatus 100, a large-capacity tray unit 102, an inserter 104, a folding unit 105, a finisher 106, and a cutter 107. This system is further coupled to a server 103.

The image forming apparatus 100 may be a copier, a facsimile machine, a printer, a multifunction peripheral or a multifunction printer (MFP) having at least one of copying, printing, scanning, facsimile, and plotter functions, or the like. According to the present example, the image forming apparatus 100 is an inkjet image forming apparatus that forms toner images on recording media by discharging ink to the recording media.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., an OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

The image forming apparatus 100 causes each unit based on, for example, an electrophotographic process to finally print out image data on a sheet. The image forming apparatus 100 is used with peripheral equipment coupled. The peripheral equipment has functions of large-capacity sheet feeding, folding, stapling, and cutting. The image forming apparatus 100 is combined with the large-capacity tray unit 102, the inserter 104 that is used to utilize a cover, the folding unit 105, the finisher 106 that performs stapling, or punching, or the cutter 107, according to purposes.

A system controller 101 controls the entirety of the image forming system. The server 103 generates image data to be printed. The system controller 101 performs processing for printing the image data generated by the server 103 and controls the peripheral equipment.

Figure 3:
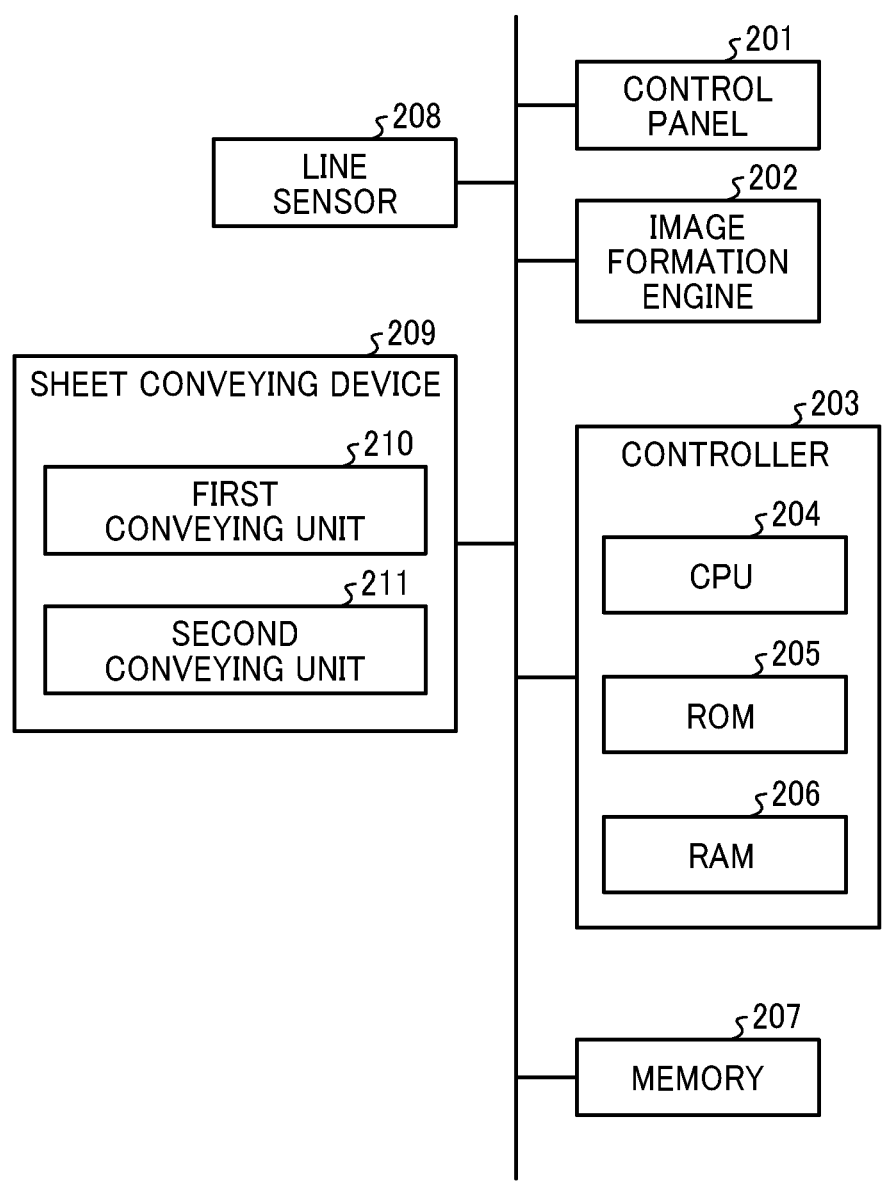
FIG. 3 is a block diagram illustrating an example of a principal configuration of an image forming apparatus.

FIG. 3 is a block diagram illustrating an example of a principal configuration of the image forming apparatus 100. The image forming apparatus 100 includes a control panel 201, an image forming engine 202, a controller 203, a memory 207, a line sensor 208, and a conveyor 209.

The control panel 201 includes various operation keys, a display such as a liquid crystal display, and a lamp such as a light-emitting diode (LED). The operation keys are used to input an operation to be performed in the use of respective functions of copying, printing, and a scanner of the image forming apparatus 100, an operation to specify the type of a sheet, or another operation. In addition, on the display, the content of a command input from the operation keys or various types of information reported from the image forming apparatus 100 to a user are displayed.

The image forming engine 202 that functions as an image forming device includes, for example, an exposure unit, a tandem image forming unit, an intermediate transfer belt, an intermediate transfer roller, and a secondary transfer device based on the electrophotographic process. The image forming engine 202 performs printing-out.

The controller 203 includes a central processing unit (CPU) 204, a read-only memory (ROM) 205, and a random access memory (RAM) 206. The memory 207 includes, for example, a hard disk drive (HDD) and a non-volatile memory (non-volatile random access memory, in short, NVRAM).

The line sensor 208 optically detects a position in a sub-scanning direction of a sheet conveyed by the conveyor 209. In the present embodiment, as the line sensor 208, a normally known long contact image sensor (CIS) is used, for example. The long CIS includes a light source such as an LED and a light-receiving lens in a main-scanning direction.

The conveyor 209 is a unit that conveys a sheet that has been fed and conveyed. In this example, the conveyor 209 includes a first conveying unit 210 that functions as a first conveyor and a second conveying unit 211 that functions as a second conveyor.

Figure 4:
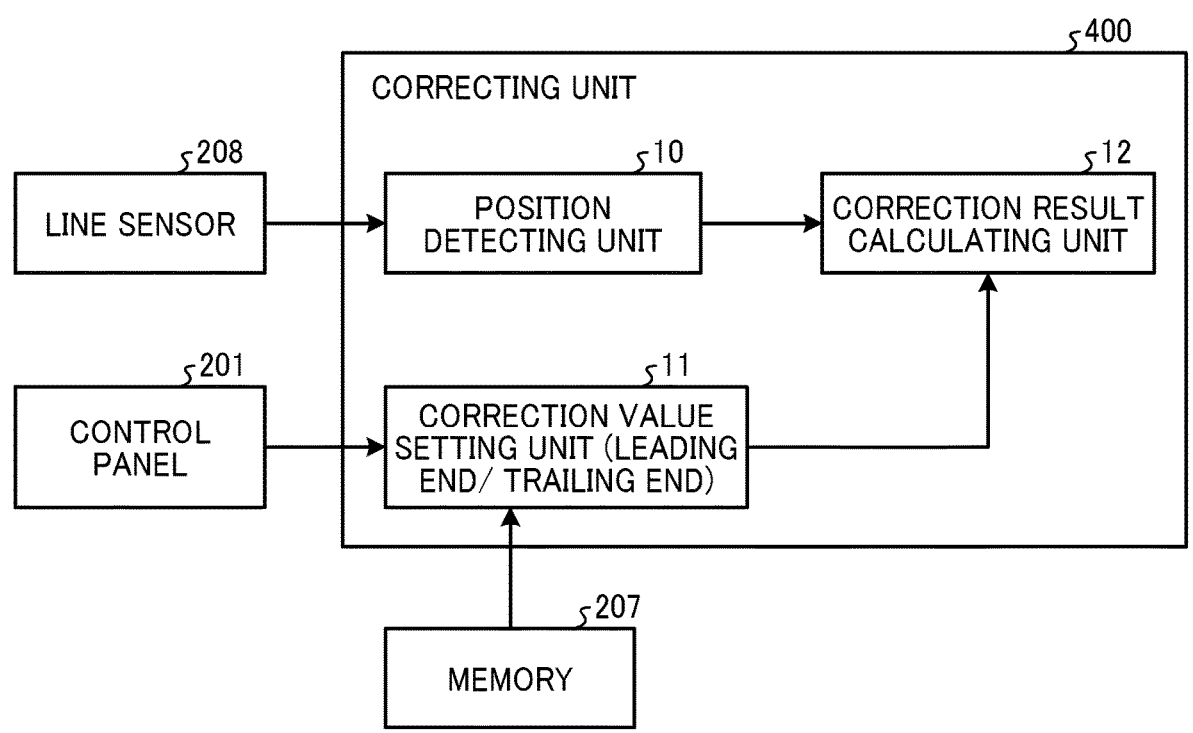
FIG. 4 is a block diagram illustrating an example of a configuration that functions as a correcting unit.

FIG. 4 is a block diagram illustrating an example of a configuration that functions as a correcting unit 400 that functions as a corrector, in other words, correcting circuitry. A position detecting unit 10 calculates an end of a sheet S and a detection mark position on the basis of an image obtained by the line sensor 208. A correction value setting unit 11 selects correction value data to be used for a current sheet S from the memory 207 on the basis of sheet information relating to the sheet S and correction value data stored in the memory 207. The sheet information relating to the sheet S is input via the control panel 201 in order to calculate correction values for the leading end and the trailing end of the sheet S. Examples of information relating to the sheet S serving as an origin of the correction value include the thickness of the sheet S and the type of the sheet S. Examples of the type of the sheet S include plain paper and coated paper. A correction result calculating unit 12 corrects a position detection result calculated by the position detecting unit 10 by using the correction value set by the correction value setting unit 11, and calculates a final position detection result. Specific examples of the above will be described later.

Some or all of the functions of the correcting unit 400 described above may be configured by software or hardware included in the controller 203. Alternatively, some or all of the functions of the correcting unit 400 may be executed by the server 103 of FIG. 2.

Reading Configuration and Operation of Sensor.

Figure 5A:
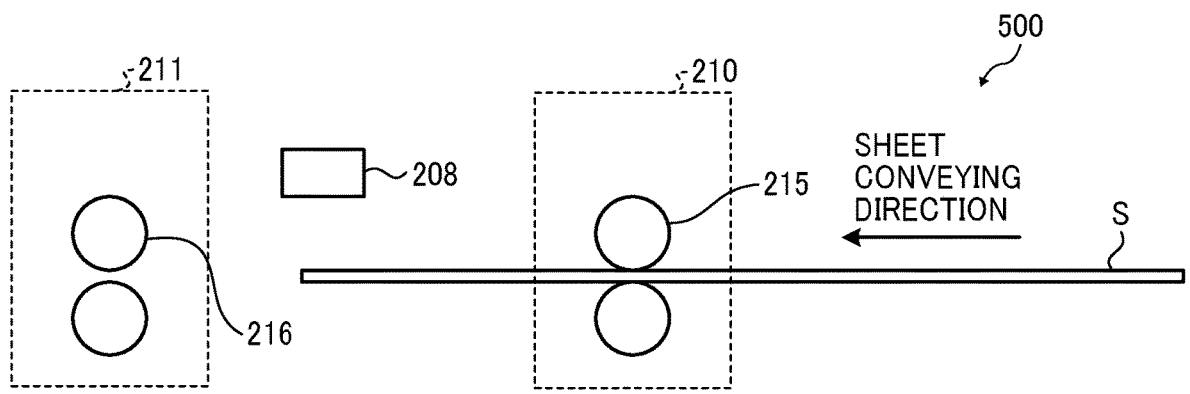
FIG. 5A is an explanatory diagram illustrating an example where a line sensor reads the leading end of a sheet.
Figure 5B:
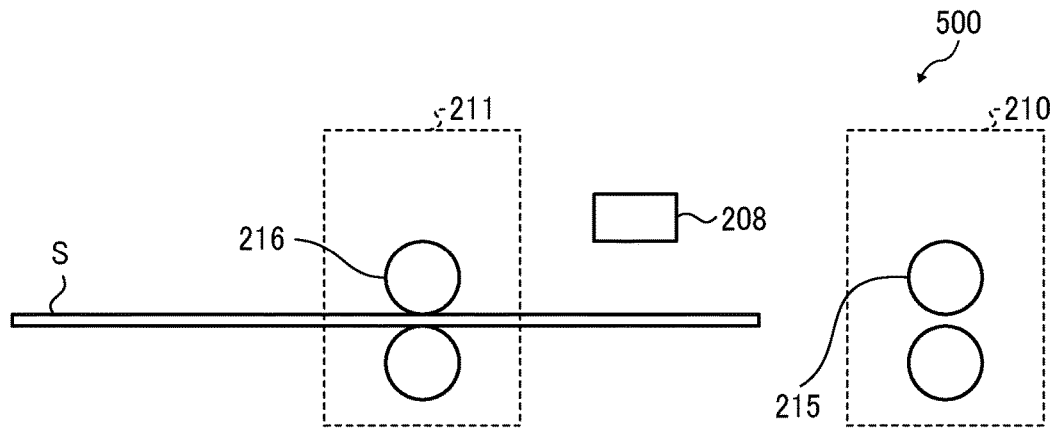
FIG. 5B is an explanatory diagram illustrating an example where the line sensor reads the trailing end of the sheet.

Next, sheet conveyance in a case where the line sensor 208 reads the leading end of the sheet S and in a case where the line sensor 208 reads the trailing end of the sheet S is described. FIGS. 5A and 5B are explanatory diagrams illustrating an example where the line sensor 208 reads the leading end and the trailing end of the sheet S. In a case where the line sensor 208 detects a position of an image (detection patterns 300a and 300b; see FIG. 6) on a leading end of the sheet S, a pair of sheet conveying rollers 215 conveys the sheet S. The pair of sheet conveying rollers 215 is located on an upstream side of a sheet conveying direction in the sub-scanning direction. Therefore, the conveyance speed of the sheet S is determined according to the rotation speed of the pair of sheet conveying rollers 215. In a case where the line sensor 208 detects a position of an image (specifically, detection patterns 300c and 300d. See FIG. 6) on a trailing end of the sheet S, a pair of sheet conveying rollers 216 conveys the sheet S. The pair of sheet conveying rollers 216 is located on a downstream side of the sheet conveying direction in the sub-scanning direction. Therefore, the conveyance speed of the sheet S is determined according to the rotation speed of the pair of sheet conveying rollers 216.

Ideally (in design), the pair of sheet conveying rollers 215 and the pair of sheet conveying rollers 216 have exactly the same conveyance speed. However, in practice, in some cases, the pair of sheet conveying rollers 215 and the pair of sheet conveying rollers 216 do not have the same conveyance speed due to variations resulting from the accuracy of parts outside the pair of sheet conveying rollers 215 and the pair of sheet conveying rollers 216, variations in rotation speed of driving motors (not illustrated) that drive the pair of sheet conveying rollers 215 and the pair of sheet conveying rollers 216. In such cases, when the sheet S is detected according to the conveyance speed of the sheet S of one of the pair of sheet conveying rollers 215 and the pair of sheet conveying rollers 216, a difference from the speed of the other of the pair of sheet conveying rollers 215 and the pair of sheet conveying rollers 216 causes a detection error.

The case of the pair of sheet conveying rollers 215 and the pair of sheet conveying rollers 216 has been described above. However, in a case where a conveying belt performs conveyance but in a case where conveyance speed is switched before and after the line sensor 208, for example, such that the speed of the conveying belt is different between before and after the line sensor 208, the same failure occurs.

In a known image forming apparatus, there is a disadvantage wherein the distance read by the inline sensor (a numerical value indicating how many lines the sensor has read) includes an error due to a variation in the speed of conveyance of the recording medium, or mechanical variations.

Next, a case is described where the line sensor 208 calculates the coordinates of detection patterns in four corners of the sheet S and ends of the sheet S. FIG. 6 is an explanatory diagram illustrating an example of the detection of an end of the sheet S in the sub-scanning direction and distance correction using a detection pattern.

In FIG. 6, detection patterns 300a, 300b, 300c, and 300d are respectively formed on a left-hand side and a right-hand side of the leading end of the sheet S and a left-hand side and a right-hand side of the trailing end of the sheet S. The pair of sheet conveying rollers 215 and the pair of sheet conveying rollers 216 convey the sheet S in which the detection patterns 300a, 300b, 300c, and 300d have been formed, as described above. The line sensor 208 reads the detection patterns 300a, 300b, 300c, and 300d to obtain pixels G1 and G2. The pixels G1 and G2 are used to detect sheet end to detection pattern distances SP1, SP2, SP3, and SP4.

As described above, the specified pixels G1 and G2 of the line sensor 208 are used to calculate the coordinates of the leading end and the trailing end of the sheet S and the detection patterns 300a, 300b, 300c, and 300d. In the example of FIG. 6, the detection patterns 300a, 300b, 300c, and 300d are arranged in four corners of the sheet S, and the coordinates are calculated. Therefore, the four sheet end to detection pattern distances SP1, SP2, SP3, and SP4 are calculated.

Correction Processing.

Next, an example of correction of the sheet end to detection pattern distances SP1, SP2, SP3, and SP4 is described. FIG. 7 is a table illustrating an example of a correction coefficient for correcting a detected distance at the leading end or the trailing end of the sheet S. As described referring to FIGS. 5A and 5B, conveyance speed is different between the leading end and the trailing end of the sheet S. Therefore, in the present embodiment, as illustrated in FIG. 7, coefficients different from each other are set for the leading end and the trailing end of the sheet S, and values obtained by multiplying detection results by correction coefficients are used. The table of FIG. 7 indicating correction value data is stored in the memory 207.

Examples of a method for calculating a leading end magnitude of the sheet S and a trailing end magnitude of the sheet S that are described above include a method for measuring, outside, a distance read by the line sensor 208 and a distance of a target object read by the line sensor 208 and obtaining a correction value from a difference between the distances above. In a case where an image position is corrected on the basis of results before correction including a deviation, the position of a printed image after correction also deviates from a target position. A desired correction value may be estimated from the printed image after correction.

In the example described above, the line sensor 208 performs reading in order to read four corners of a sheet S having a variety of sheet size. However, in a case where a portion to be read is secured, a spot type sensor such as a reflection type sensor may perform reading. Even in a case where a sensor is used, the sensor itself is moved and a reading position is changed for each sheet size, so that reading can be performed.

Next, an example is described where a correction value is switched for each type (thickness) of the sheet S. FIG. 8 is a table illustrating an example of a correction value in a case where the correction value is switched for each type of the sheet S. The table of FIG. 8 indicating correction value data for each sheet information is stored in the memory 207. When the thickness (illustrated as sheet thickness) of the sheet S changes, contact pressures between the conveying roller pairs 215 and 216 and the sheet S and a slip ratio (a ratio at which the sheet S slips without tracking the rotation of a roller normally) also change. Therefore, a variation in conveyance speed is generated for each thickness of the sheet S. In order to cancel an influence of the thickness of the sheet S, parameters of the leading end and the trailing end of the sheet S are set for the respective thicknesses of the sheet S, and the parameters are stored in advance in the memory 207. The correction value is switched according to sheet information stored in the memory 207.

In the description above, the parameters are switched for each of the thicknesses of the sheet S. However, there is a possibility that frictional forces against the pair of sheet conveying rollers 215 and the pair of sheet conveying rollers 216 will change according to surface property of the sheet S. Therefore, parameters may be set for each type (thickness) of the sheet S.

In a case where the correction value is uniquely obtained for each of the types (thicknesses) of the sheet S, the table of FIG. 8 described above may be applied to all of conveying devices (systems including the image forming apparatus 100). However, as described referring to FIG. 6, there is an individual difference among the apparatuses in some cases. In a case where there is an individual difference among the apparatuses but a difference in sheet thickness is constant, correction values $\alpha 1$ and $\beta 1$ with respect to a reference sheet thickness are calculated for each of the apparatuses according to the method illustrated in FIG. 6.

FIG. 9 is a table illustrating an example of a correction value obtained by adding a coefficient at the time of position detection correction at the leading end or the trailing end of the sheet S to the correction value of FIG. 8. Here, as illustrated in FIG. 9, a coefficient for each type of the sheet S is multiplied, so that a correction value for each sheet thickness is obtained. For example, in the case of a leading end of sheet thickness 2 in FIG. 9, a correction value is obtained by multiplying $\alpha 1$ by 1.1. The table of FIG. 9 indicating correction value data for each piece of sheet information is stored in the memory 207. The table of FIG. 9 indicating the correction value data for each of the pieces of sheet information may not be stored in the memory 207, a correction value with respect to the reference sheet thickness may be stored, and the correction value setting unit 11 may calculate data of a correction value for each of the pieces of sheet information. Stated another way, in the case of the leading end of sheet thickness 2 in FIG. 9, a value obtained by multiplying $\alpha 1$ by 1.1 may be stored in the memory 207, or the correction value setting unit 11 may multiply $\alpha 1$ by 1.1.

Figure 10:
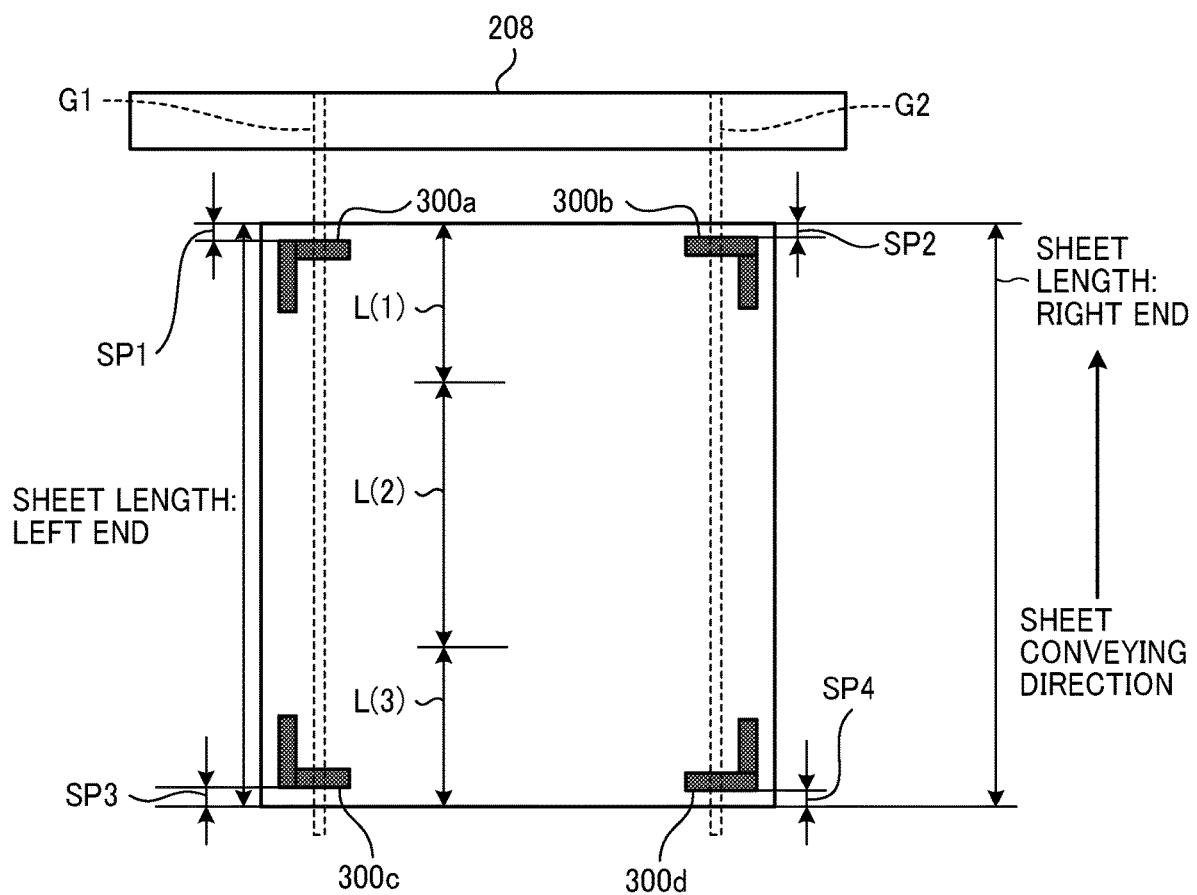
FIG. 10 is an explanatory diagram illustrating an example of correcting a sheet end to detection pattern distance on a sheet and a length of the sheet.

Referring to FIG. 6, a case has been described where the sheet end to detection pattern distances SP1 to SP4 on the sheet S are detected and corrected. Here, a case is described where the length of the sheet S is also calculated. FIG. 10 is an explanatory diagram illustrating an example of correcting the sheet end to detection pattern distances SP1 to SP4 on the sheet S and the length of the sheet S.

The length of the sheet S is calculated in the following three patterns.

1. Case where the pair of sheet conveying rollers 215 performs conveyance

2. Case where both the conveying roller pairs 215 and 216 perform conveyance

3. Case where the pair of sheet conveying rollers 216 performs conveyance

The number of conveying rollers that sandwich the sheet S increases depending on the length of the sheet S, and therefore a number increases according to a degree of influence.

Therefore, a result after correction of the length of the sheet S is described below.

Length of sheet $S$=sheet length($L(1)$) of pair of sheet conveying rollers 215×$\alpha$+sheet length($L(2)$) of both conveying roller pairs 215 and 216×$\gamma$+ sheet length($L(3)$) of pair of sheet conveying rollers 216×$\beta$ α: Correction value of the pair of sheet conveying rollers 215 (i.e., the first correction value)

γ: Correction value of both the pair of sheet conveying rollers 215 and the pair of sheet conveying rollers 216 (i.e., the third correction value)

β: Correction value of the pair of sheet conveying rollers 216 (i.e., the second correction value)

An example has been described above where two pairs, the pair of sheet conveying rollers 215 and the pair of sheet conveying rollers 216, perform conveyance. However, three or more pairs of rollers may perform conveyance depending on the length of the sheet S. In this case, a parameter according to the number of rollers and a combination of rollers for conveyance may be stored in advance in the memory 207, and the parameter may be used for correction.

Accordingly, in the embodiment described above, in a configuration in which the sheet S is conveyed immediately below the line sensor 208, the line sensor 208 reads a prescribed position in the sub-scanning direction of the sheet S, and corrects a result of reading.

Stated another way, a conveying device according to the present embodiment includes a line sensor 208 to read a sheet to be conveyed, a first conveying unit 210 arranged on an upstream side from the line sensor 208 in a sheet conveying direction, a second conveying unit 211 arranged on a downstream side from the line sensor 208 in the sheet conveying direction, and a corrector (i.e., correcting circuitry) to correct a distance of a sheet S read by the line sensor 208 to an actual distance. A correction value corrected by the corrector includes at least the first correction value and the second correction value. The first correction value corrects a distance read by the line sensor 208 when the first conveying unit 210 conveys the sheet S. The second correction value corrects a distance read by the line sensor 208 when the second conveying unit 211 conveys the sheet S. By doing this, in a system in which the line sensor 208 reads and corrects an image position, the image position can be corrected without an influence of conveyance speed.

The sheet S may include plain paper that is normally used in printing, and special paper such as coated paper or a film for an overhead projector (OHP). In addition, position detection in the configuration of the conveying device of the image forming apparatus 100 described as an example in the present embodiment is not only applicable to the image forming apparatus 100 but is also applicable to a sheet conveying device that is independently used. Further, the image forming apparatus 100 described as an example in the present embodiment is an image forming apparatus that performs an electrophotographic process. However, the image forming apparatus 100 is also applicable to a liquid discharging apparatus that discharges liquid on a sheet to be conveyed.

Program.

A program executed in the present embodiment is incorporated into the ROM 205, and is provided. The program may be recorded in a computer-readable recording medium such as a compact disc read-only memory (CD-ROM), a flexible disk (FD), a compact disc recordable (CD-R), or a digital versatile disc (DVD), and the program may be provided.

Further, the program executed in the present embodiment may be stored on a computer connected to a network such as the Internet, and the program may be downloaded via the network to be provided. The program executed in the present embodiment may be provided or distributed via a network such as the Internet.

The program executed in the present embodiment has a module configuration including the respective units described above. As actual hardware, the CPU 204 reads the program from the ROM 205 described above and executes the program, so that the respective units described above are loaded onto a principal storage (memory), and the respective units are generated on the principal storage (memory).

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of the invention, and are included in the scope of the invention recited in the claims and its equivalent.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A conveying device comprising:
   a sensor configured to read a sheet to be conveyed;
   a first conveyor arranged on an upstream side from the sensor in a sheet conveying direction of the sheet;
   a second conveyor arranged on a downstream side from the sensor in the sheet conveying direction of the sheet; and
   correcting circuitry configured to correct a distance of the sheet having an error detected when the sensor reads the sheet conveyed by the first conveyor and the second conveyor, to an actual distance,
   the correcting circuitry configured to use a first correction value correcting a distance read by the sensor when the first conveyor conveys the sheet and a second correction value correcting a distance read by the sensor when the second conveyor conveys the sheet.

2. The conveying device according to claim 1,
   wherein the correcting circuitry is configured to correct a distance that the sensor has read in accordance with a length of the sheet and a position of a pattern printed on the sheet.

3. The conveying device according to claim 1, further comprising:
   a memory configured to store sheet information relating to the sheet,
   wherein the correcting circuitry is configured to calculate the first correction value and the second correction value in accordance with the sheet information.

4. The conveying device according to claim 3,
   wherein the sheet information includes information relating to a thickness of the sheet.

5. The conveying device according to claim 3,
   wherein the sheet information includes information relating to a type of the sheet.

6. The conveying device according to claim 1,
   wherein a correction value corrected by the correcting circuitry includes a third correction value to correct a distance of the sheet that the sensor has read when both the first conveyor and the second conveyor convey the sheet.

7. An image forming apparatus comprising:

the conveying device according to claim 1; and an image forming device configured to form an image on a sheet.

8. A position detection method comprising:

reading, with a sensor, a sheet to be conveyed by a first conveyor and a second conveyor that are arranged on an upstream side and a downstream side, respectively, from the sensor in a sheet conveying direction of the sheet; and correcting a distance of the sheet having an error detected by the reading, to an actual distance, the correcting using a first correction value correcting a distance read by the sensor when the first conveyor conveys the sheet and a second correction value correcting a distance read by the sensor when the second conveyor conveys the sheet.

9. A non-transitory recording medium storing computer-readable program code which, when executed by a computer, cause the computer to perform a method, the method comprising:

reading, with a sensor, a sheet to be conveyed by a first conveyor and a second conveyor that are arranged on an upstream side and a downstream side, respectively, from the sensor in a sheet conveying direction of the sheet; and correcting a distance of the sheet having an error detected when the sensor reads the sheet conveyed by the first conveyor and the second conveyor, to an actual distance, the correcting using a first correction value correcting a distance read by the sensor when the first conveyor conveys the sheet and a second correction value correcting a distance read by the sensor when the second conveyor conveys the sheet.

* * * * *